June 25, 1963

F. J. BRACEY ETAL 3,094,825

FOOD PACKAGING MACHINE

Filed Sept. 18, 1961

June 25, 1963  F. J. BRACEY ETAL  3,094,825
FOOD PACKAGING MACHINE
Filed Sept. 18, 1961  6 Sheets-Sheet 2

June 25, 1963   F. J. BRACEY ETAL   3,094,825
FOOD PACKAGING MACHINE
Filed Sept. 18, 1961   6 Sheets-Sheet 5

United States Patent Office 3,094,825
Patented June 25, 1963

3,094,825
FOOD PACKAGING MACHINE
Frederick J. Bracey, West Acton, Paul Joonase, Melrose, and Wilbur A. Mason, East Longmeadow, Mass., assignors to W. R. Grace & Co., Cambridge, Mass., a corporation of Connecticut
Filed Sept. 18, 1961, Ser. No. 139,340
13 Claims. (Cl. 53—112)

This invention relates to food packaging machinery for packaging a series of irregularly shaped items or articles of somewhat varying sizes and weights, such as turkeys, chickens, hams and like foodstuffs. More particularly a machine according to this invention will tightly enclose these food articles in thin plastic bags which are evacuated and sealed in preparation for freezing or similar processing.

A machine according to the invention removes air from a package of foodstuff placed in a bag of flexible material, twists the neck of the evacuated bag to seal it, makes the seal permanent by applying and crimping a clip around the twisted neck of the bag, and cuts off the excess bag material beyond the sealing clip. Machines for this general purpose are known, for example those shown in the patents to A. G. Russell et al. Nos. 2,733,442 and 2,733,564 of February 7, 1956, and in the patent to G. W. Pearce et al. No. 2,886,928, of May 19, 1959, assigned to the same assignee as is the present invention. However, these and other prior machines require a considerable amount of handling of the individual articles being packaged and therefore are not economical in the use of personnel or time. Furthermore, such prior machines sometimes require considerable adjustment or decisions by an operator in order to handle packages where the articles being wrapped vary greatly in size, one from another.

An object of the present invention therefore is to provide, in a packaging machine of the desired type, a reduction in the amount of handling required and in the number of operations which must be under human control or demand judgment of an operator.

Another object of the invention is to increase the rate at which articles may be packaged over the rate normally encountered in previous vacuum packaging machines.

A further object is to provide automatic means for measuring the size of individual articles being packaged and for adjusting the machine accordingly to suit the size of each article being packaged.

These and other objects of the invention are met, in the machine shown here as an example, by providing a series of individual carriers or containers for the articles to be bagged, loading the articles in open bags in a vertical position on the carriers, and transporting the carriers horizontally to and from stations at which the evacuation, twisting, sealing and cut-off operations are performed in proper sequence, all with the minimum need for suman attendance except when desirable for insuring consistent results. Variations in the size of articles being packaged are taken care of by means measuring the height of the article in each carrier as it is transported horizontally, thereby automatically adjusting the height of the carrier until the article reaches a standard or datum level with relation to the bag evacuating mechanisms and other processing equipment which follow in the operating stations of the machine.

These and further objects, advantages and details of that which is believed to be novel and included in this invention will be clear from the following description and claims taken with the accompanying drawings in which is illustrated an example of a packaging machine embodying the invention and incorporating the horizontally moving carriers with the measuring and adjusting mechanisms mentioned above.

General Organization

In carrying out the objects of the invention in one embodiment thereof, a support or base 20 is provided as a framework upon which the rest of the machine is mounted. As shown, the support or base may be made in several sections. One end of the machine is the unloading and loading end, designated generally by the number 22, and this may be regarded as the beginning and the end of all the packaging operations, called collectively, the packaging cycle.

In the illustrative machine, the articles A to be vacuum-packaged are moved through various operating locations or stations by means of a conveyor chain 24, guided principally by angle irons 26, arranged to form a closed loop which in plan view (FIG. 1) appears as an elongated oval with an enlarged lobe at one end. A sprocket wheel 28 near the loading and unloading end 22 drives the chain around a relatively small radius at that end while the enlarged lobe at the opposite end of the oval guides the chain as at 30 around the bag evacuating apparatus.

Figure 4:
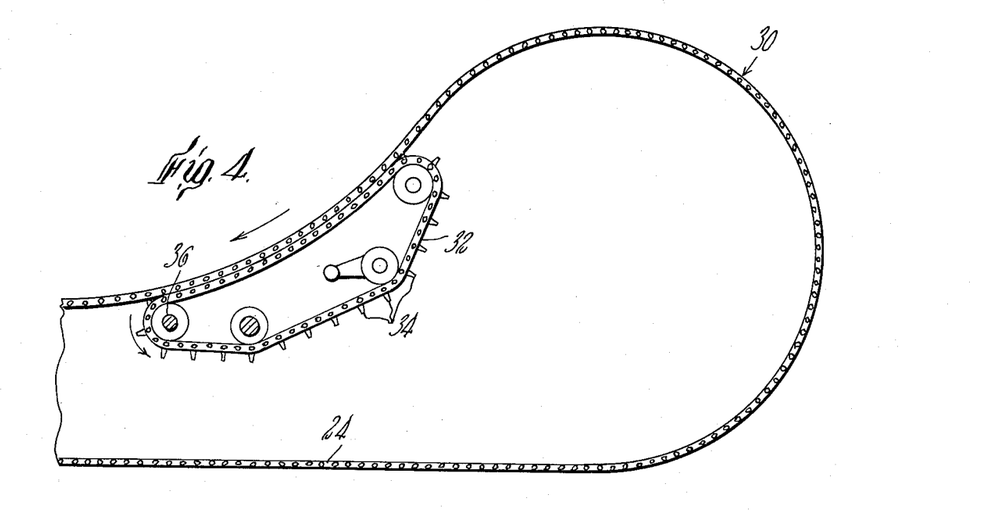
FIG. 4 is a plan view showing further details of the driving mechanisms, many parts being removed for clarity.

The conveyor chain 24 is driven constantly counterclockwise around its oval path by means of a driving chain 32 which carries thereon driving cleats or lugs 34 engageable between links of the conveyor chain 24 as shown most clearly in FIG. 4. The driving chain 32 in turn is moved by means of a vertical driving shaft 36 connected to the main driving motor 38 as by a chain 40 and gear box 42 or other suitable arrangement. Obviously the driving motor 38 may be provided with appropriate means to start and stop it, and speed controls which are not shown.

As shown best in FIGS. 8 through 11, draft elements 44 are secured to the conveyor chain 24 at regular intervals corresponding to the intervals between the bag evacuating elements (nozzles) hereinafter described. Each draft element 44 carries a pair of rollers 46 which ride on the angle irons 26 forming the guide for the chain. Each draft element 44 has a drag link 48 pivoted thereto, the other end of the link being similarly pivotally secured to a carrier frame 50 having guiding rollers 52 riding on tracks 54 which follow the contour of the angle irons 26.

Each carrier frame 50 has a suitably braced vertical upright 56 secured thereto which supports a pivoted article carrier 58, which is called a bucket because of its shape and function. The bucket is pivotally supported at one of its lower corners as at 60 to a bucket holder 62 and is usually latched to the bucket holder in a generally vertical position by means of a hook 64 on the bucket engaging over the tip of a pivoted spring-pressed latch 66 on the bucket holder. Beyond its pivot the latch 66 is provided with a tripping roller 68 for purposes which will later be apparent.

Each bucket holder 62 is movable up and down with its bucket on the upright 56 of each carrier frame. Rollers 70 on the bucket holder engage against rails 72 on each upright 56 to guide the bucket holder and bucket in their vertical movements. A ratchet face 74 on the upright 56 is engaged by a pawl 76 on the bucket holder so that if the bucket is forced upwardly by external means the pawl will permit such upward movement and hold the bucket holder and bucket in upwardly adjusted position. Downward movement of the bucket and bucket holder with respect to the upright 50 is accomplished by release of the pawl through downward movement of a pawl release arm 78 carrying a roller 80 which can tilt the pawl out of engagement with the ratchet 74 when lowering of the bucket is required in operation of the machine.

The conveyor chain 24 will, after the driving motor is started, move each carrier or bucket in sequence past a series of operating stations or mechanisms at which the following are accomplished:

Starting with the loading station, and assuming the bucket 58 to be in upright latched position, at the loading station an operator will load the bucket with an article A which has been previously placed within a bag B made of impervious flexible material of the character required for the subsequent packaging operations. Rollers 82 on the bucket ride on supporting and guiding tracks 84 to hold the bucket in its upright latched position at a level suitable and convenient to the operator for the loading operation.

After loading, the bucket 58 will pass a portion of the machine where it will be lowered by tracks 84 to a base level or position where it would be unlikely for the largest article expected to be processed to interfere with subsequent machine operations. This lowering operation is carried out at 86.

Immediately following the lowering operation the carrier is raised at location 88 until the top of the bagged article reaches a second or datum level, at which point the raising is automatically stopped and the carrier continues to move horizontally toward the bag evacuation apparatus.

A second machine operator stationed at the location 90 gathers the open end E of the bag and engages it with the end of an evacuation nozzle 92 which is one of several later described in detail.

After the operator has engaged the bag end with a nozzle the machine will secure the bag properly to the nozzle automatically and the nozzle and bucket 58 will move simultaneously around the lobe 30 while suction is being applied to the nozzle to evacuate the bag. Bag evacuation begins at about the point indicated at 94 and continues to about the point 96, FIG. 1.

Figure 1:
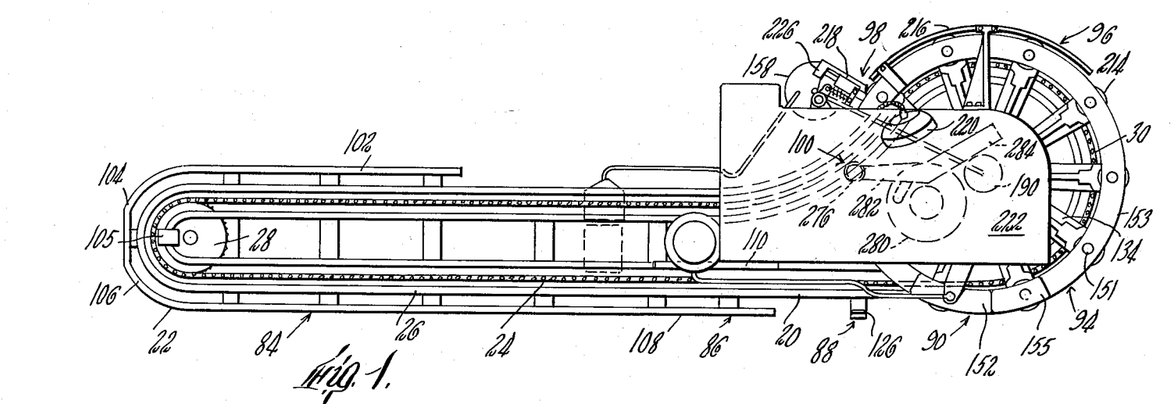
FIG. 1 is a plan view of a machine according to the invention showing the general layout and location of apparatus for carrying out the various steps in the packaging process, but without the article carriers.

Toward the end of the evacuation portion of the cycle, each nozzle, still engaged with the bag, is rotated about its vertical axis, thus twisting and closing the neck of the bag and maintaining the vacuum therein. This is done at location 96. Immediately thereafter, as at 98, a metal clip C is applied around the twisted neck to seal the bag closed, a knife operates to cut off excess material from the end E of the bag, the nozzle is released from the cut end and the excess material is carried away as at 100.

After this, the conveyor 24 continues to move the bucket 58 back toward the starting point where it is unloaded or dumped and again made ready for the next loading. Sloping portion 102 on the return side of the bucket supporting track 84 raises the bucket to loading level if the bucket is not up to that level.

Figure 10:
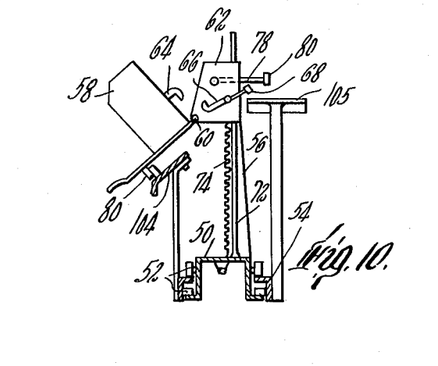
FIG. 10 is a side vertical sectional view of the end of the machine shown in FIG. 9, taken on the line and in the direction of the arrows 10—10 of FIG. 9.

As the bucket 58 is carried around the end sprocket wheel 28 where the supporting track 84 is dipped as at 104, the bucket is released from its latch by trip plate 105 as indicated in FIG. 10 and the packaged article is dumped on to a table or conveyor for subsequent handling or processing. Immediately after this, track 84 slopes upwardly again at 106 so that the bucket is raised upright, relatched and ready for the next loading. The loading station extends from the end of upwardly sloping track 106 to the beginning of the lowering section 86, providing room for more than one operator if that is desired.

*Lowering the Bucket at 86*

Figure 2:
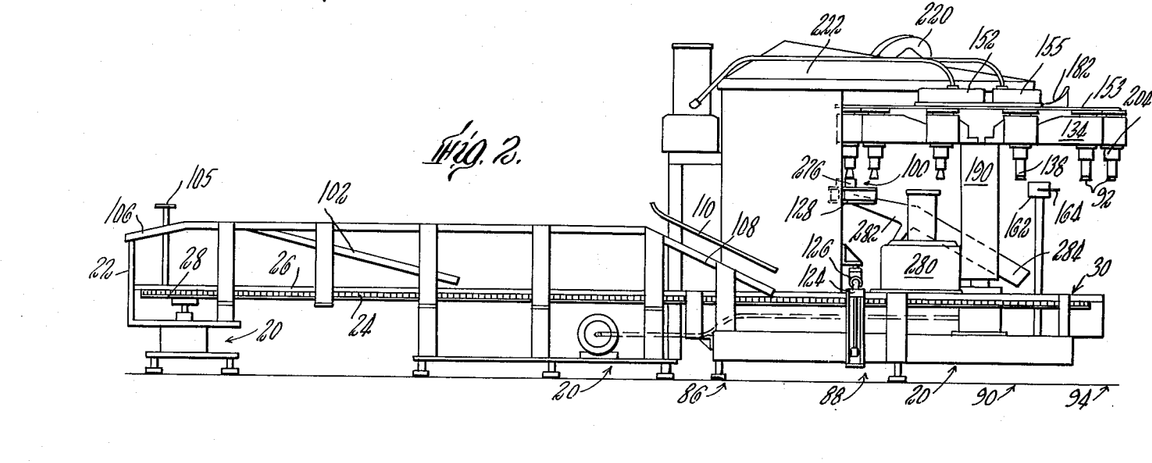
FIG. 2 is a side elevational view of the machine of FIG. 1 showing the parts of the machine involved at the start of the packaging cycle.
Figure 3:
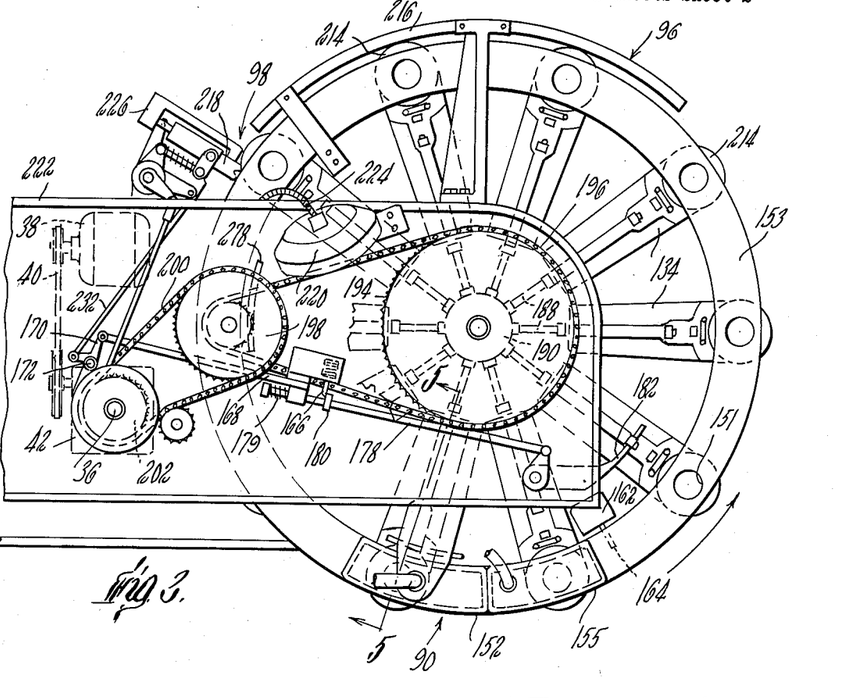
FIG. 3 is a plan view of a portion of the machine on a larger scale, with portions removed, showing driving mechanisms and apparatus for evacuating the bags.
Figure 8:
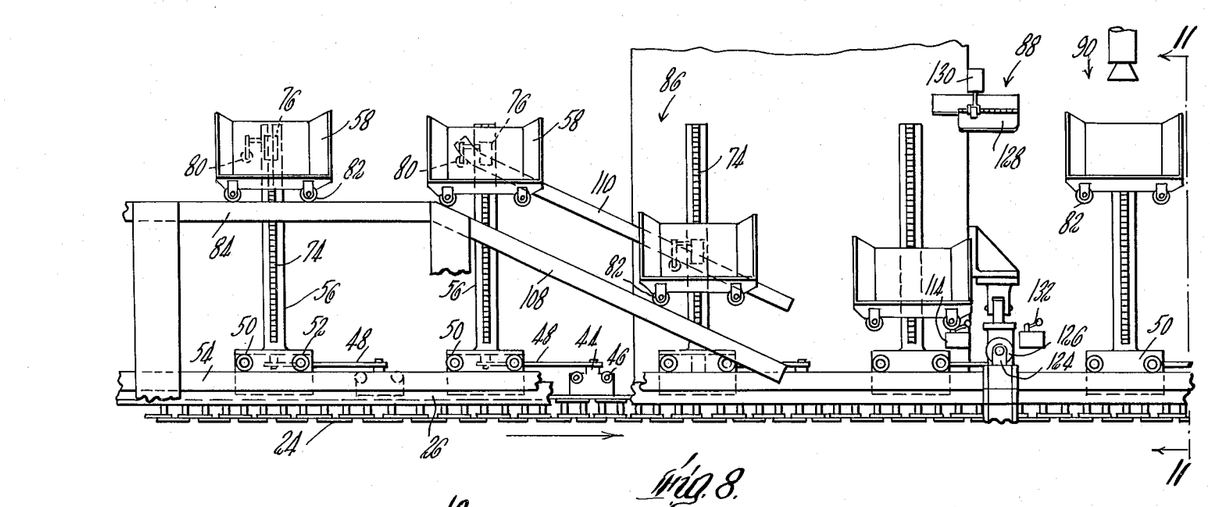
FIG. 8 is a side elevational view similar to FIG. 2 but on a larger scale and showing the article carriers and associated mechanisms for controlling their vertical positions at various points near the start of the packaging cycle.
Figure 9:
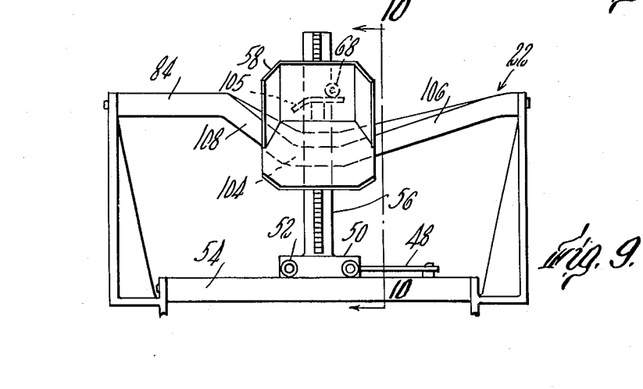
FIG. 9 is an elevational view of that end of the machine where unloading and loading take place.

After the point where the buckets are loaded, the supporting track 84 assumes a downward slope as at 108 and the rollers 82 are permitted to follow this downward slope because the pawl 76 is released by engagement of the roller 80 on the pawl release arm 78 under a downward sloping pawl release guide 110, shown most clearly in FIGS. 2 and 8. When the bucket reaches the end of the downwardly sloping track 108 and the end of release guide 110, the pawl will then be re-engaged with the rack 74, with the bucket at a base level previously calculated to be below that required to accommodate the largest or highest article which is expected to be packaged by the machine.

*Raising and Measuring at 88*

At this station, mechanisms are brought into play which will raise the carrier until the top of the bagged article being carried reaches a standard or datum level suitable for the evacuation, twisting and sealing operations to follow. A switch actuating arm 112 extending from the rear of the upright 56 of the carrier frame will engage a roller-actuator on a control switch 114, actuating a hydraulic or pneumatic mechanism of known kind to raise a piston rod 116 which in turn will lift a lever 118 pivoted as at 120 to the machine frame. The lever 118 is pivotally connected at 122 to a sliding lifter bar 124 positioned so that its top end will engage under the bucket and lift the bucket and bucket holder, the pawl 76 permitting movement in this direction. A roller 126 on the end of the lifter bar permits this action while the bucket is moving in the horizontal direction.

At this location in the machine a hinged switch plate 128, secured to the frame of the machine above the lifter bar 124, is used as a gauge to stop upward movement of the carrier when the top of the article therein has reached the desired datum level. This effect is accomplished through a stop switch 130 which is engaged when the switch plate is lifted and operates to stop the hydraulic or pneumatic mechanism which is driving the piston rod 116 and cause it to return the piston rod to its lower position. Thus all articles in buckets leaving this station have been raised to a level so that the bag tops will be in a proper position to be engaged with an evacuation nozzle 92 during subsequent operations.

As the carrier frame leaves this station, the switch actuating arm 112 strikes and actuates a safety reverse switch 132 which also will lower the piston rod 116 in a manner readily understood, in case the switch 130 has not been actuated, for example due to an empty bucket, depress the lever 118 and lower the lifter bar 124 in preparation for the next loaded bucket to come along.

Engaging the Bag With Nozzle 92

The article carrier or bucket is now guided by the conveyor chain in a generally circular path underneath and coinciding with the path of rotation of a turret 134 carrying a number of the nozzles 92 which are to be used in evacuating the bags. Each nozzle is provided at its end with an outwardly flared portion 136 and is surrounded by a vertically movable sealing collar or cylinder 138. Normally the collar 138 is spring-pressed as by a spring 140 downwardly to a position where it engages at its bottom around the flared portion 136 on the nozzle. However, at this point of operation in the machine, sealing collar 138 is raised so that there is an annular space between the outside flare on the nozzle and the bottom of the collar, as shown in FIG. 5.

Raising of the collar is accomplished through a sliding lifter rod 142 having a yoke 144 extending therefrom under a flange 146 on the outside of the collar. The upper end of the lifter rod is provided with an actuating roller 148 which engages over a segmental lifter cam 150 fixed above this portion of the turret. Therefore, when a nozzle reaches this portion or position of rotation of the turret the sealing collar will be raised from the nozzle so that an operator may grasp the open end of a bag which is under the nozzle and guide or position the bag end around the nozzle and the end of the sealing cylinder.

Figures 5, 6, 7:
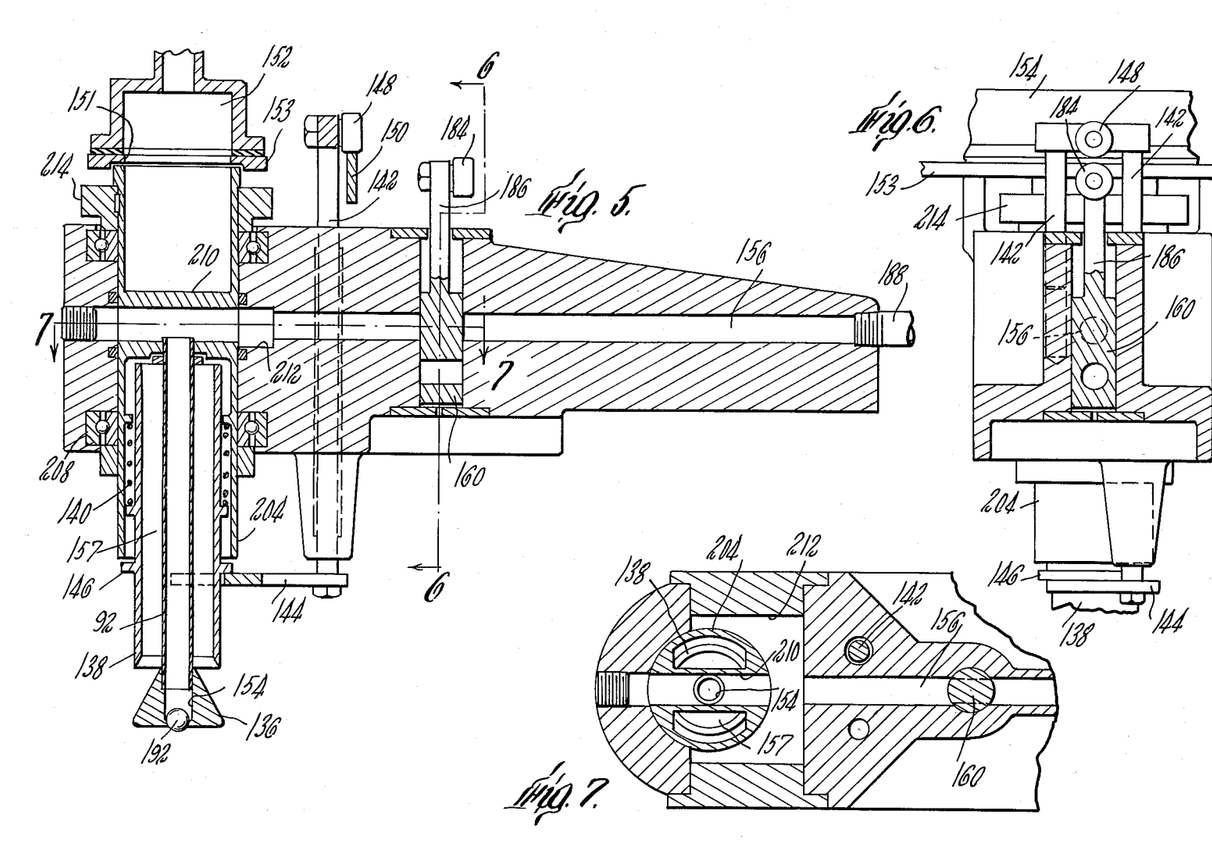
FIG. 5 is a vertical sectional view on the line 5—5 of FIG. 3, but on a further larger scale, showing details of the bag evacuating apparatus.
FIG. 6 is a vertical sectional view of the bag evacuating apparatus on the line 6—6 of FIG. 5.
FIG. 7 is a horizontal sectional view of the evacuating apparatus on the line 7—7 of FIG. 5.

A vacuum box 152 arranged above this segment of the turret will draw air through an aperture 151 in circular turret plate 153 through the upper end of the nozzle assembly and through the space 157 in the cylinder surrounding the nozzle proper as shown in FIGS. 5 and 7, so that the open end of the bag will be more easily positioned around the flared end portion of the nozzle and the bottom of the collar. At this point the operator may turn his attention to the next bag.

Figures 11, 12, 13, 14:
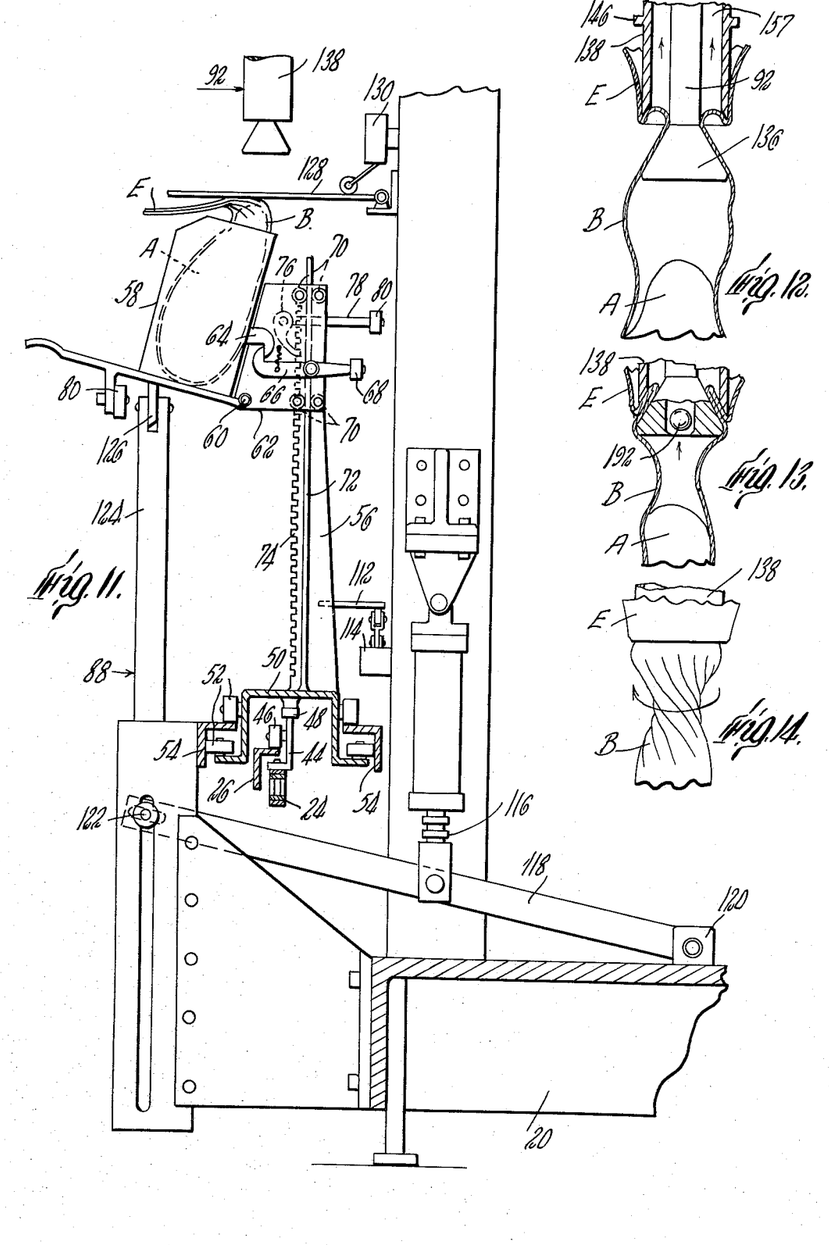
FIG. 11 is a vertical sectional view on the line 11—11 of FIG. 8 on a larger scale, showing the relationship of a package carrier to mechanisms which control its height before evacuation takes place.
FIGS. 12, 13 and 14 are a sequence of side views, partly in section where required for clarity, indicating operation of the principal elements which, respectively, engage the open end of a bag, evacuate the bag, and twist the end of the evacuated bag, these elements also being shown in FIG. 5 in relationship to other associated parts.

A second vacuum box 155 following box 152 continues the suction through aperture 151 as the turret continues its movement, and the bag material will then be held against the sides of the flare on the nozzle and against the bottom edge of the collar as seen in FIG. 13. The operation of engaging the bag end with the nozzle is now completed automatically by the succeeding motions.

Sealing the Bag to the Nozzle

Further movement of the turret will permit the roller 148 to ride off the lifter cam 150 so that the spring 140 will close the sealing collar 138 against the flare 136 of the nozzle. This position of the parts is shown in FIG. 13. Note that the bag material is securely fastened and sealed around the end of the nozzle so that evacuation of the bag may take place properly. Suction is about to be supplied to the nozzle through its central passage 154 which is connected with a horizontal passage 156 in the turret leading to a source of vacuum 158 as later described. A sliding valve 160 in each passage 156 determines whether or not the particular nozzle connected to that passage receives or does not receive suction.

Obviously, if no bag is connected to the particular nozzle involved there would be no point in providing suction to that nozzle. For this reason a control is provided which leaves the valve closed if no bag is present but which opens the valve so that suction may take place if a bag is properly positioned in engagement with the nozzle. Referring to FIGS. 2, 3, 4, 5 and 6, a bag detecting switch 162 is mounted as on a pedestal from the base or frame 20 of the machine and has a radially extending arm 164 thereon positioned in the path of movement of the buckets around the turret somewhat below the ends of the nozzles 92 but above the height of the datum level of switch plate 128 which gages the maximum height of the buckets with their contents. If a bagged article in a bucket has been previously properly connected to a nozzle, when it passes the switch arm 164 the material of the bag neck extending between the top of the article and the bottom of the nozzle will strike against the switch arm and actuate the switch 162. The switch controls the position of a solenoid latch 166 carried by a push rod 168 which in turn is connected to and moved by a double bell crank lever 170. Bell crank 170 is rocked about its pivot 172 by a cam follower 174 which rides on a cam 176 (FIG. 16) driven by main driving shaft 36. As is obvious from the shape of the cam, push rod 168 will be continually reciprocated, carrying the solenoid latch with it. Slidably connected to the end of the push rod 168 is a valve actuator rod 178 which is pressed by a spring 179 so that its latching collar 180 normally engages the solenoid latch 166 when extended. Thus, when the solenoid is actuated, the push rod 168 and the valve actuator rod 178 move together as a unit and push a pivoted valve lifter cam 182 underneath the path of movement of lifter roller 184 on valve stem 186 of the valve 160. This will lift the valve to its open position and the valve is designed to remain open or closed unless deliberately moved to its other position.

If a bag is not present or not properly secured to the nozzle as it passes the switch actuating arm 164, the switch 162 will not be operated. When this happens the solenoid latch 166 will be withdrawn from engagement with the latching collar 180, aided by the action of spring 179, and reciprocation of push rod 168 will not result in movement of the valve lifter 182 into the path of movement of the lifter roller 184. The valve will thus remain closed and suction will not be applied to this nozzle, thus maintaining the vacuum of the system. On the next reciprocation of push rod 168, the latch 166 will be reset behind the latching collar 180, ready to move the rod 178 and the valve lifter cam if the switch has actuated the solenoid.

Evacuation of Bags at 94

As just described, each of the bags connected to a nozzle 92 will be provided with suction because of opening of the valve 160. This suction is provided through the passages 156 in the arms of turret 134, connected by pipe fittings 188 joined to a central rotatable manifold 190 located at the center of the lobe 30 of the machine. Suitable connection is made at all times from the manifold to the vacuum source 158 so that in each arm of the turret where the valve 160 is opened, suction will take place through the horizontal passage 156, through the vertical passage 154 of the nozzle and from the bag which is connected thereto. A ball valve 192 in the end of each nozzle will shut off that nozzle whenever the pressure in the bag becomes lower than the pressure in the passage 154.

The turret is being driven at all times at a speed exactly matching the speed of the conveyor chain. This may be done through a sprocket wheel 194 on the turret driven by a chain 196 from a reduction sprocket gear 198 and drive transfer chain 200 from a driving sprocket 202 on driving shaft 36. Because the driving of the turret, the opening of the valves 160, the movement of the bag gripping cylinders 138 and all subsequent operations are controlled by the same driving shaft 36, which also drives the chain of the conveyor, it is relatively easy to calculate, adjust, and maintain the proper timing and movement of the various parts of the machine.

Twisting of Bag Necks at 96

By the time the turret has moved a nozzle around to the location 96 it is calculated that sufficient evacuation of the bag in the corresponding carrier has been accomplished. As explained previously, the neck of the bag is gripped between the end of the sealing cylinder 138 and the flared end 136 on the nozzle. The carrier which holds the bagged article is progressing around the lobe portion of the conveyor at the same rate as the nozzle and underneath it. The neck of the bag is twisted by rotating the nozzle and its sealing cylinder about their axis while the bagged article remains stationary in its bucket. For this purpose each nozzle is rotatably mounted in its arm of the turret as by a sleeve 204 supported in bearings 206 and 208 and carrying a hollow cross bar 210 which communicates at all times with the central passageway 154 of the nozzle. Maintenance of connection with the passageway 156 is established through a central chamber 212 in the turret arm surrounding the sleeve 204 through an effective arc of at least 180° to expose the ends of the hollow cross bar. Therefore, no matter what the rotative position of the nozzle sleeve, a passageway for suction is always present between the horizontal passage 156 and the vertical passage 154.

At the top of the nozzle sleeve an annular nozzle twisting wheel 214 is keyed or otherwise secured so that its movement will impart movement to the nozzle sleeve, the nozzle and the sealing cylinder carried thereby. Wheel 214 is adapted to engage a stationary outer arcuate twisting bar 216 arranged adjacent the path of turret movement in this segment of its rotation. The bar 216 may be provided with a facing of rubber or other friction material to improve its driving engagement with the wheels 214. In a manner readily understood, when the nozzle twisting wheel strikes against the twisting bar 216 and the turret continues to rotate, the wheel will start to roll along the bar, rotating the nozzle and twisting the neck of the bag as illustrated in FIG. 14. When the twisting wheel leaves the end of the twisting bar, rotation of the nozzle will stop and the bucket will carry the evacuated bag with its twisted neck to the next station.

Applying the Sealing Clip at 98

After the bag neck is twisted a metal clip C is applied around the twisted neck to seal it. The clip crimping head 218 may be of any conventional type but the one shown here is preferably of the nature disclosed in United States patent application Serial No. 834,467, filed August 18, 1959, by Donald Richardson and assigned to the same assignee as is the present invention. The clips are fed in appropriate fashion from a clip magazine 220 shown here as mounted on the top of a housing 222 which encloses part of the turret and other mechanisms. A guide chute 224 for the clips conveys them from the magazine to the crimping head 218 in a manner well known in the art.

Figures 15, 16, 17, 18:
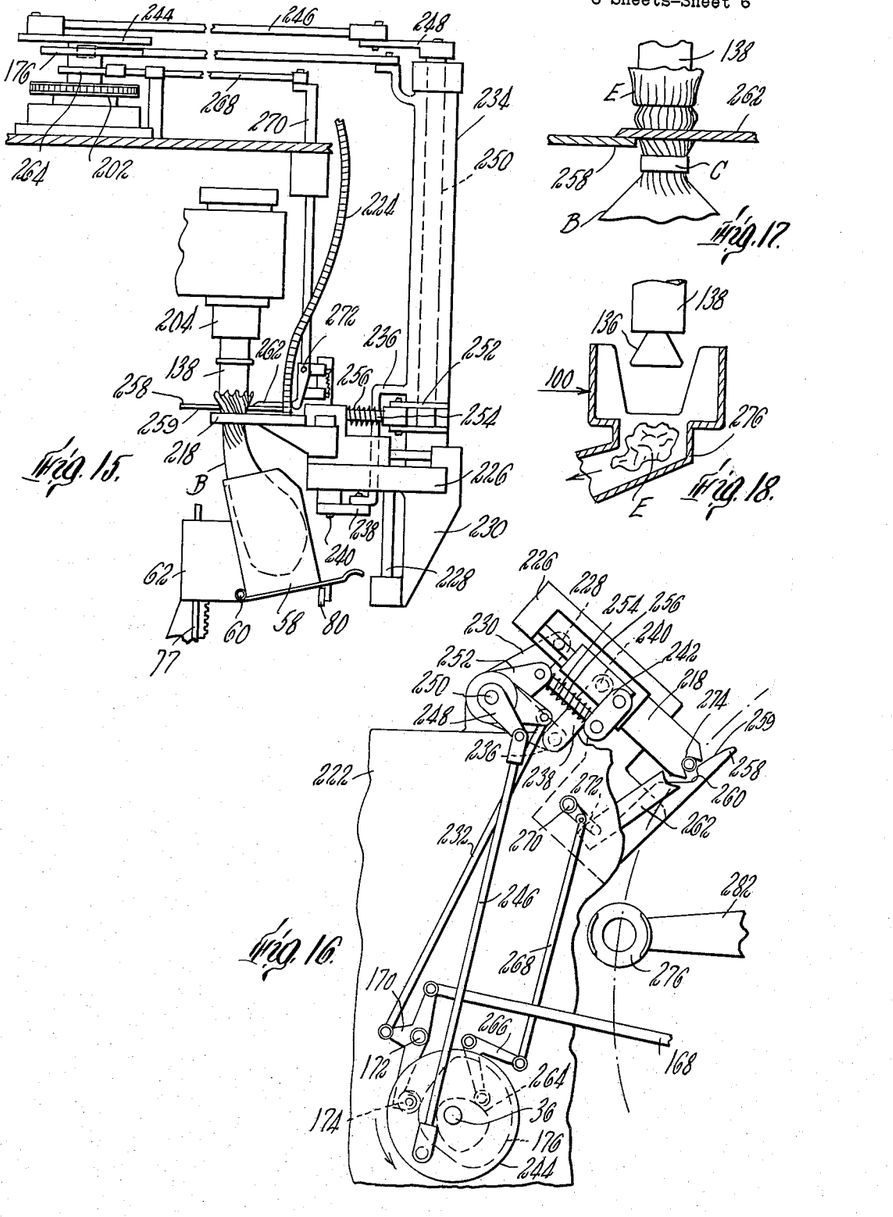
FIG. 15 is a fragmentary side elevation showing parts of the machine where the sealing clip is applied to the twisted bag neck and excess bag material is cut off.
FIG. 16 is a plan view illustrating driving mechanisms for the parts of the machine shown in FIG. 15.
FIG. 17 is a side view, partly in section, showing the elements which cut off the excess bag material after twisting and crimping.
FIG. 18 is a view similar to FIG. 17 but showing the relationship of parts which dispose of the cut off bag end.

The crimping head is notched as shown in FIG. 16 so that the twisted neck of a bag may be received therein, and the head is mounted for a swinging motion to follow the moving bag while the clip is being applied. For this purpose the crimping head is mounted on a swinging frame 226 which is pivotally supported as at 228 on a support arm 230 which is fixed to a portion of the main frame or base of the machine. The main drive shaft 36 of the machine moves the swinging frame about its pivot back and forth in small arcs through movement of the double bell crank arm 170 actuated by cam 176 previously mentioned. When this bell crank is moved by the cam a rocker arm 232 is moved and this in turn moves a rocker column 234 having a lower extension 236 connected by a rocker link 238 to a pivot 240 under the swinging frame 226. This gives the necessary motion so that the end of the crimping head will follow movement of the nozzle and of the bucket underneath it during the crimping operation, and will return to receive another bag neck in its notch in time to apply another clip.

The internal elements (not shown) of the crimping head 218 are actuated by movement back and forth of a crimping actuator 242. The drive for this crimping actuator also comes from the main driving shaft 36 through a driving disk 244 to which a crimp drive arm 246 is eccentrically pivoted, the other end of the crimp drive arm moving a crank arm 248 on the end of a vertical shaft 250 which extends through the rocker column 234 and has a crimp driving crank 252 secured at its lower end. Suitable connection is made between the drive crank 252 and the crimping actuator 242 as by a driving rod 254 pivoted at its ends to these elements. One of the pivots for this driving rod is made preferably of a pin and slot type and a compression spring 256 extends between these elements on the driving rod so that compensation is made for movement of the crimping head as it is swung back and forth in its arcs.

Trimming the Sealed Bag at 100

In quick succession after application of the clip, excess bag material from above the clip is cut off and the material cut off is released from the nozzle and carried away for suitable disposal. The swinging frame 226 carries the bag cutting elements which include the cutting anvil 258 with a guiding face 259 and a locating notch 260 therein, and a reciprocating knife 262 which is operated from the drive shaft 36 by a cutter cam 264 through bell crank 266, connecting rod 268, and vertically extending crank element 270 with a lower crank arm 272 pivotally connected to one end of the knife. The cutting end of the knife is notched as at 274 and it slides on top of the cutting anvil, the locating notch in the anvil and the notch in the knife cooperating to hold and cut the twisted bag neck just above the clip each time that the knife is reciprocated.

Obviously the evacuated bag with its twisted, crimped and trimmed end will be continued to be carried by the bucket in the path of movement of the conveyor chain, but the trimming from the end of the bag will still be carried by the evacuation nozzle as the turret continues to rotate. Suction to the nozzle has previously or is then interrupted by closing the valve 160 through a stationary cam surface (not shown) arranged in the path of movement of the roller 184 to depress it and close the valve if it has not already been closed. At a time when the nozzle is above the open end of a disposal chute 276, a lifter cam 278 similar to the cam 150 engages under the roller 148, raising the yoke 144 and releasing the sealing collar 138 from the flared portion 136 on the nozzle end. A high velocity blower 280 with its inlet 282 connected to the disposal chute 276 and its outlet 284 directed toward a waste basket or bin will remove the cut end of the bag from the nozzle as soon as it is released by raising of the collar 138. If desired, an air blast may be provided through the space 157 to assist in the removal action.

Unloading

As explained under the "General Organization" section, the conveyor chain moves the bucket horizontally and the sloping track 102 raises the bucket to loading level, the latch is tripped, the packaged article is dumped, and the bucket is relatched and continued on its way ready for a subsequent loading. Obviously, if desired, the articles might be removed from the buckets by hand and the bucket dumping arrangement then need not be provided. It should also be clear that the buckets need not be raised to the loading level until just prior to the time when they are to be loaded.

As will be evident from the foregoing description, certain aspects of this invention are not limited to the particular details set forth as an example, and it is contemplated that various and other modifications and applications of the invention will occur to those skilled in the art. It is therefore intended that the appended claims shall cover such modifications and applications as do not depart from the true spirit and scope of the invention.

What is claimed as new and is desired to be secured by Letters Patent of the United States is:

1. A machine for vacuum packaging in bags a series of articles varying in size one from another, said machine comprising an array of spaced article carriers each adapted to receive and hold a bagged article therein, a series of operating stations and operating means horizontally arranged in sequence respectively including a station for loading a carrier with a bagged article, means for lowering the carrier to a base level, means for raising the carrier to a second level determined by the height of the load in the carrier to position the article at a datum level, means for evacuating the bag, means for twisting the neck of the evacuated bag, means for sealing the twisted neck, and means for discharging the bagged, evacuated and sealed packaged article from the carrier, and further means continuously driving said carriers horizontally past said operating stations and operating means in the sequence aforesaid.

2. A machine for vacuum packaging in bags a series of articles varying in size one from another, said machine comprising an array of spaced article carriers each adapted to receive and hold a bagged article therein, a series of operating stations and operating means horizontally arranged in sequence respectively including a station for loading a carrier with a bagged article, means for lowering the carrier to a base level, means for raising the carrier to a second level determined by the height of the load in the carrier, a station for presenting the bag to a vacuum source, means for securing the bag neck around the vacuum source, means for evacuating the bag, means for twisting the neck of the evacuated bag, means for applying a clip to seal the neck, means for trimming excess bag material from above the sealed neck, means for disposing of the excess material, and means for discharging the bagged, evacuated and sealed packaged article from the carrier, and further means continuously driving said carriers in a repeating cycle horizontally past said operating stations and operating means in the sequence aforesaid.

3. A machine for vacuum packaging in bags a series of articles varying in size one from another, said machine comprising an array of regularly spaced article carriers each adapted to receive and hold a bagged article therein, a series of operating stations and operating means horizontally arranged in a closed loop respectively including a station for loading a carrier with a bagged article, means for lowering the carrier to a base level, means for raising the carrier to a second level determined by the height of the load in the carrier and a station for presenting the bag to one of a series of regularly spaced, moving vacuum nozzles for thereafter evacuating the bag, and means continuously driving said carriers past said operating stations and operating means in the sequence aforesaid.

4. In a packaging machine, an array of regularly spaced, vertically and horizontally movable buckets each adapted to receive one of a series of articles varying in size which is to be vacuum packaged in a bag, a series of equally regularly spaced horizontally movable vacuum nozzles, means continuously moving said vacuum nozzles simultaneously in a recirculating horizontal path, means continuously moving said buckets horizontally at the same rate through a cycle of stations and means including, a station for loading each of said buckets with an article contained in a bag with an open top end, means lowering each bucket vertically to a base level below that required to accommodate the largest article expected to be packaged, means raising each bucket vertically from said base level, means stopping said raising means at a second level determined by the size of the bagged article in each said bucket, means maintaining each bucket at said second level for further horizontal movement at that level, means securing each open bag top end outside and around the end of one of said vacuum nozzles, means guiding said buckets in a path coinciding in part with the recirculating path of said moving nozzles, means evacuating each bag through a nozzle while so secured and moving in said path, means causing relative rotation between each said nozzle and bag to twist the end of the evacuated bag secured thereto, means sealing the twisted bag end, and a station for unloading each bagged, evacuated and sealed article from each bucket, said bucket moving means returning each bucket again to said station for loading each of said buckets and repeating said cycle.

5. A packaging machine as claimed in claim 4 including, after said means for securing each said bag top end outside and around the end of one of said nozzles and before said means evacuating each bag through a nozzle, means responsive to the absence of a bag secured outside a nozzle for disabling said evacuating means through that nozzle.

6. In a packaging machine, an array of regularly spaced, horizontally movable buckets each adapted to receive one of a series of articles which is to be vacuum packaged in a bag, a series of equally regularly spaced horizontally movable vacuum nozzles, means continuously moving said vacuum nozzles simultaneously in a recirculating horizontal path, means continuously moving said buckets at the same rate through a cycle including a path coinciding in part with the path of said moving nozzles, means securing a bag top in each bucket around the end of one of said vacuum nozzles, means evacuating each bag through a nozzle while so secured and moving in said coincident path, and means responsive to the absence of a bag top secured around a nozzle for disconnecting said evacuating means from that nozzle.

7. In a packaging machine, an array of regularly spaced, vertically and horizontally movable buckets each adapted to receive one of a series of articles varying in size which is to be vacuum packaged in a bag, a series of equally regularly spaced horizontally movable vacuum nozzles, means continuously moving said vacuum nozzles simultaneously in a recirculating horizontal path, means continuously moving said buckets horizontally at the same rate through a cycle of stations and means including a station at a loading level for loading each of said buckets with an article contained in a bag with an open top end, means lowering each bucket vertically to a base level below that required to accommodate the largest article expected to be packaged, means raising each bucket vertically from said base level, means stopping said raising means at a second level determined by the size of the bagged article in each said bucket and the level of said horizontally movable nozzles aforesaid, means holding each bucket in its second level position for further horizontal movement at that level, means securing the open bag top end in each bucket around and outside the end of one of said vacuum nozzles, means guiding said buckets in a path coinciding in part with the recirculating path of said moving nozzles, means evacuating each bag through a nozzle while so secured and moving in said path, means rotating each said nozzle about a vertical axis to twist the end of the evacuated bag secured thereto, means applying a clip to the twisted bag end to seal it, and means discharging each bagged, evacuated and sealed article from each bucket, said bucket moving means returning each bucket again to said loading level and station for loading each of said buckets and repeating said cycle.

8. A packaging machine as claimed in claim 4 in which said means for evacuating each bag includes a valve and means periodically opening said valve governed by movement of a bag secured outside and around the end of a nozzle, and means disabling said valve opening means in the absence of a bag secured outside a nozzle, whereby said evacuating means is rendered inoperative through such nozzle.

9. In a packaging machine, an array of regularly spaced, vertically and horizontally movable buckets each adapted to receive one of a series of articles varying in size which is to be vacuum packaged in a bag, a series of equally regularly spaced horizontally movable vacuum nozzles, means continuously moving said vacuum nozzles simultaneously in a recirculating horizontal path, means continuously moving said buckets at the same rate through a cycle of stations and means including, a station at a loading level for loading each of said buckets with an article contained in a bag with an open top end, means lowering each bucket vertically to a base level below that required to accommodate the largest article expected to be packaged, means raising each bucket vertically from said base level, means stopping said raising means at a second level determined by the size of the bagged article in each said bucket and the level of said horizontally movable nozzles aforesaid, means holding each bucket in its level position for further horizontal movement at that level, means returning said raising means to said base level, a station for engaging the open bag top end in each bucket around the end of one of said vacuum nozzles, means securing each bag end outside the nozzle so engaged, means guiding said buckets in a path coinciding in part with the recirculating path of said moving nozzles, means evacuating each bag through a nozzle while so secured and moving in said path, means rotating each said nozzle about a vertical axis to twist the end of the evacuated bag secured thereto, means applying a clip to the twisted bag end to seal it, means cutting excess material from the bag above the clip, means releasing said material from said nozzle for disposal, means discharging each bagged, evacuated and sealed article from each bucket, and means raising each bucket again to said loading level and returning each bucket to said station for loading, for repeating said cycle.

10. A packaging machine as claimed in claim 4 in which said means for moving said buckets comprises a closed loop chain conveyor and said means for moving said vacuum nozzles comprises a rotatable turret, said chain and turret both being driven from a common power shaft.

11. A packaging machine as claimed in claim 9 in which said means for moving said buckets comprises a horizontally moving chain conveyor and a bucket-supporting track which is sloped downwardly to provide said means for lowering said buckets from loading level to base level and sloped upwardly to return said buckets to said loading level at the end of said repeating cycle.

12. In a machine for vacuum packaging articles in bags, an article carrier adapted to hold a bagged article to be vacuum packaged, means for moving said carrier in a predetermined path, an evacuation nozzle with a flared end adapted to be surrounded by the neck of a bag to be evacuated, a sleeve around the nozzle movable toward said flared end to grip the neck of a bag surrounding the end and thus secure the bag to the nozzle, means for moving said nozzle in a path adjacent and parallel to said predetermined carrier path, and means for applying a vacuum through said nozzle while it is moved in its path, whereby a bag secured to the nozzle is evacuated while the bagged article is moved by the carrier.

13. In a machine for vacuum packaging articles in bags, an article carrier adapted to hold upright a bagged article to be vacuum packaged, means for moving said carrier in a predetermined horizontal path, an evacuation nozzle with a cylindrical surface thereon, rotatable about a vertical axis and with a flared end adapted to be surrounded by the neck of a bag to be evacuated, a sleeve around the nozzle movable toward said flared end to grip the neck of a bag surrounding the end and thus secure the bag to the nozzle, means for moving said nozzle above said carrier in a horizontal path adjacent and parallel to said predetermined carrier path, means for applying a vacuum through said nozzle and means for thereafter rotating said nozzle about its vertical axis comprising a stationary member frictionally engageable by said cylindrical nozzle surface while the nozzle is moved in its horizontal path, whereby a bag secured to the nozzle is evacuated and its neck twisted while the upright bagged article is moved by the carrier.

References Cited in the file of this patent

UNITED STATES PATENTS

| | | |
|---|---|---|
| 2,120,272 | Williams et al. | June 14, 1938 |
| 2,510,457 | Bjering | June 6, 1950 |
| 2,732,988 | Feinstein | Jan. 31, 1956 |
| 2,812,628 | Russell et al. | Nov. 12, 1957 |
| 2,893,184 | Leinart | July 7, 1959 |
| 3,046,713 | Belknap | July 31, 1962 |